United States Patent
Zheng et al.

(10) Patent No.: US 10,644,352 B2
(45) Date of Patent: May 5, 2020

(54) LITHIUM-ION NON-AQUEOUS BATTERY ELECTROLYTE SOLUTION, AND LITHIUM-ION BATTERY USING THE ELECTROLYTE SOLUTION

(71) Applicant: SHENZHEN CAPCHEM TECHNOLOGY CO., LTD., Pingshan District Shenzhen (CN)

(72) Inventors: Zhongtian Zheng, Pingshan District Shenzhen (CN); Qiao Shi, Pingshan District Shenzhen (CN); Ling Zhong, Pingshan District Shenzhen (CN); Shiguang Hu, Pingshan District Shenzhen (CN); Changchun Chen, Pingshan New District Shenzhen (CN); Xionggui Lin, Pingshan New District Shenzhen (CN)

(73) Assignee: SHENZHEN CAPCHEM TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/085,067

(22) PCT Filed: Dec. 29, 2016

(86) PCT No.: PCT/CN2016/113010
§ 371 (c)(1),
(2) Date: Sep. 14, 2018

(87) PCT Pub. No.: WO2018/006564
PCT Pub. Date: Jan. 11, 2018

(65) Prior Publication Data
US 2019/0081354 A1    Mar. 14, 2019

(30) Foreign Application Priority Data

Jul. 8, 2016    (CN) .......................... 2016 1 0539967

(51) Int. Cl.
*H01M 10/0525* (2010.01)
*H01M 10/0566* (2010.01)
*H01M 10/0567* (2010.01)

(52) U.S. Cl.
CPC ... *H01M 10/0566* (2013.01); *H01M 10/0525* (2013.01); *H01M 10/0567* (2013.01); *H01M 2300/0025* (2013.01)

(58) Field of Classification Search
CPC ......... H01M 10/0566; H01M 10/0525; H01M 10/0567
See application file for complete search history.

(56) References Cited

U.S. PATENT DOCUMENTS

| | | | |
|---|---|---|---|
| 2007/0151666 A1 | 7/2007 | Moeller et al. | |
| 2009/0325065 A1* | 12/2009 | Fujii | H01M 4/04 429/199 |
| 2015/0147645 A1* | 5/2015 | Lee | H01M 4/139 429/200 |
| 2015/0364792 A1* | 12/2015 | Watahiki | H01M 10/054 429/338 |

FOREIGN PATENT DOCUMENTS

| | | |
|---|---|---|
| CN | 1989175 A | 6/2007 |
| CN | 101931107 A | 12/2010 |
| CN | 104969406 A | 10/2015 |
| JP | 2015103361 | * 4/2015 |
| JP | 2015092476 | * 5/2015 |
| JP | 2015092476 A | 5/2015 |

OTHER PUBLICATIONS

JP2015092476 MT (Year: 2015).*
US 2015/0147645 MT (Year: 2015).*
International Search Report for PCT/CN2016/113010 dated Apr. 6, 2017 and its English translation provided by WIPO.
Written Opinion of the International Search Authority PCT/CN2016/113010 dated Apr. 6, 2017 and its English translation provided by Google Translate.

* cited by examiner

Primary Examiner — Alexander Usyatinsky
(74) Attorney, Agent, or Firm — Ladas & Parry, LLP

(57) ABSTRACT

A lithium-ion battery non-aqueous electrolyte solution, and a lithium-ion battery using the electrolyte solution. The electrolyte solution comprises one, two, or more of a compound as represented by structural formula I. $R_1$, $R_2$, $R_3$, $R_4$, $R_5$, and $R_6$ are independently selected from hydrogen, halogen atom, or a group comprising 1-5 carbon atoms. Presence of the compound as represented by structural formula I provides excellent performance at a high temperature and at a low temperature to the non-aqueous lithium-ion battery electrolyte solution.

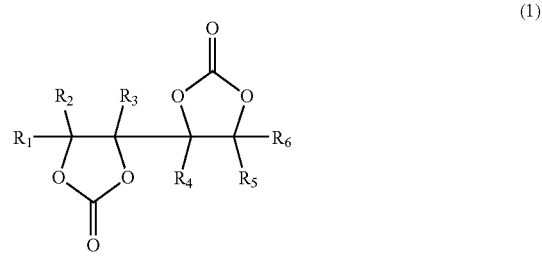

(1)

9 Claims, No Drawings

LITHIUM-ION NON-AQUEOUS BATTERY ELECTROLYTE SOLUTION, AND LITHIUM-ION BATTERY USING THE ELECTROLYTE SOLUTION

CROSS-REFERENCE TO RELATED APPLICATIONS

The present application is the U.S. national phase of PCT Application PCT/CN2016/11301 0 filed on Dec. 29, 2016, which claims priority to the Chinese patent application No. 201610539967.6 filed on Jul. 8, 2016, which are hereby incorporated by reference in their entireties.

TECHNICAL FIELD

The present invention relates to the field of lithium-ion battery technology, and in particular to a non-aqueous electrolyte for a lithium-ion battery, and a lithium-ion battery using the electrolyte.

BACKGROUND OF THE INVENTION

Lithium-ion batteries have made great strides in the field of portable electronic products due to their high operating voltage, high safety, long life and absence of memory effect, among other characteristics. With the development of new energy vehicles, lithium-ion batteries have great application prospects in power supply systems for new energy vehicles.

In a lithium-ion battery using a non-aqueous electrolyte, the non-aqueous electrolyte is a key factor affecting the high- and low-temperature performances of the battery. In particular, the additive in the non-aqueous electrolyte is particularly important for effecting the high- and low-temperature performances of the battery. During the initial charging of the lithium-ion battery, lithium ions deintercalate from the cathode material of the battery, pass through the electrolyte, and embed into the carbon anode. Due to its high reactivity, the electrolyte reacts on the surface of the carbon anode to produce compounds such as $Li_2CO_3$, LiO, LiOH, etc., thereby forming a passivation film on the surface of the anode, which is termed solid electrolyte interface (SEI) film. The SEI film formed during the initial charging process not only prevents the electrolyte from further decomposing on the surface of the carbon anode, but also has a tunneling effect for lithium ions, allowing only lithium ions to pass through. Therefore, the SEI film dictates the performances of the lithium-ion battery.

In order to improve the performances of lithium-ion batteries, many researchers have attempted to enhance the quality of the SEI film by adding various anode film-forming additives (such as vinylene carbonate, fluoroethylene carbonate, vinylethylene carbonate) to the electrolyte, so as to improve the performances of the battery. For example, JP-2000-123867A proposes improving battery characteristics by adding vinylene carbonate to the electrolyte. Vinylene carbonate can have precedence over the solvent molecules in undergoing a reductive decomposition reaction on the surface of the anode to form a passivation film on the surface of the anode, which prevents the electrolyte from further decomposing on the surface of the electrode, thereby improving the cycling performance of the battery. However, the addition of vinylene carbonate results in generation of gases during storage of the battery at high temperatures, causing the battery to swell. In addition, the passivation film formed by vinylene carbonate has a high impedance, especially under low temperature conditions, such that lithium precipitation is prone to occur during charging at low temperatures, thus affecting battery safety. Fluoroethylene carbonate can also form a passivation film on the surface of the anode to improve the cycling performance of the battery, and the passivation film formed has a relatively low impedance, which can improve the low-temperature discharging performance of the battery. However, fluoroethylene carbonate produces more gases during storage of the battery at high temperatures, which significantly reduces the high-temperature storage performance of the battery. Although vinylethylene carbonate can improve the high-temperature storage performance of the battery, the passivation film formed has too high an impedance, which seriously degrades the low-temperature discharging performance of the battery, and results in serious lithium precipitation during charging at low temperatures, thus affecting battery safety. Although existing anode film-forming additives can significantly improve certain performances of the battery, it is difficult to achieve the high- and low-temperature performances at the same time.

SUMMARY OF THE INVENTION

The present invention provides a non-aqueous electrolyte for a lithium-ion battery, which is capable of achieving high- and low-temperature performances of the battery at the same time, and further provides a lithium-ion battery comprising the non-aqueous electrolyte.

According to a first aspect of the present invention, there is provided a non-aqueous electrolyte for a lithium-ion battery, comprising one or more of a compound represented by Structural Formula 1,

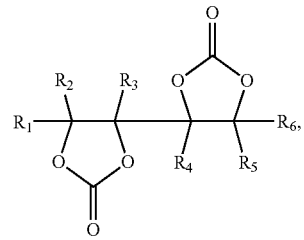

(Structural Formula 1)

wherein $R_1$, $R_2$, $R_3$, $R_4$, $R_5$, and $R_6$ are each independently selected from hydrogen, a halogen atom or a group having 1 to 5 carbon atoms.

As a further improvement of the present invention, the group having 1 to 5 carbon atoms is selected from a hydrocarbyl group, a halogenated hydrocarbyl group, an oxygen-containing hydrocarbyl group, a silicon-containing hydrocarbyl group or a cyano-substituted hydrocarbyl group.

As a further improvement of the present invention, $R_1$, $R_2$, $R_3$, $R_4$, $R_5$, and $R_6$ are each independently selected from a hydrogen atom, a fluorine atom, a methyl group, an ethyl group, a trimethylsiloxy group, a cyano group or a trifluoromethyl group.

As a further improvement of the present invention, the content of the compound represented by Structural Formula 1 is from 0.1% to 5% based on the total mass of the non-aqueous electrolyte for a lithium-ion battery.

As a further improvement of the present invention, the compound represented by Structural Formula 1 is specifically selected from the following compounds 1 to 9,

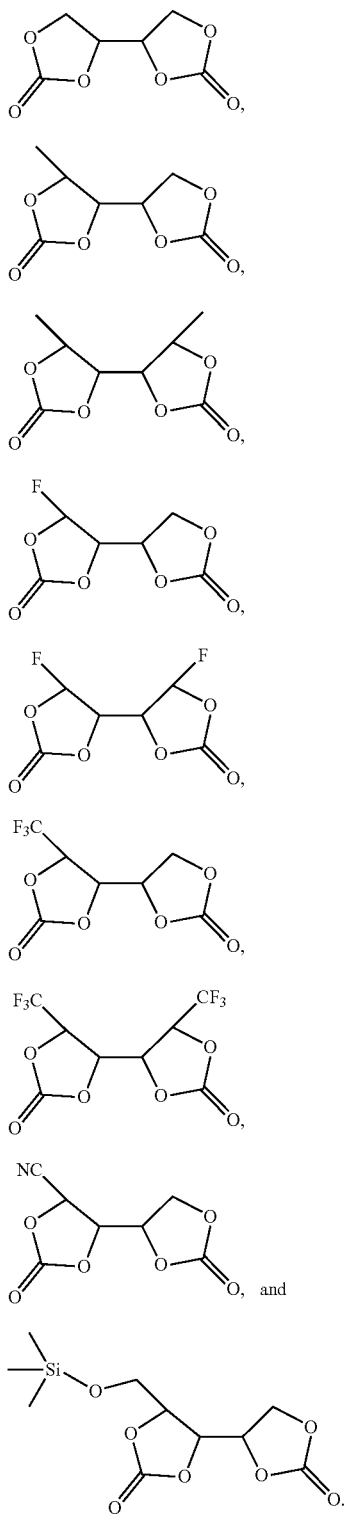

(Compound 1)
(Compound 2)
(Compound 3)
(Compound 4)
(Compound 5)
(Compound 6)
(Compound 7)
(Compound 8)
(Compound 9)

As a further improvement of the present invention, the non-aqueous electrolyte for a lithium-ion battery further comprises one or more of vinylene carbonate (VC), vinylethylene carbonate (VEC), and fluoroethylene carbonate (FEC).

As a further improvement of the present invention, the non-aqueous electrolyte for a lithium-ion battery further comprises one or more of 1,3-propane sultone (1,3-PS), 1,4-butane sultone (BS), and 1,3-propene sultone (PST).

As a further improvement of the present invention, the non-aqueous organic solvent is a mixture of a cyclic carbonate and a linear carbonate, the cyclic carbonate being selected from one or more of ethylene carbonate, propylene carbonate or butylene carbonate, and the linear carbonate being selected from one or more of dimethyl carbonate, diethyl carbonate, ethyl methyl carbonate or methyl propyl carbonate.

As a further improvement of the present invention, the lithium salt is selected from one or more of $LiPF_6$, LiBOB, LiDFOB, $LiBF_4$, $LiSbF_6$, $LiAsF_6$, $LiN(SO_2CF_3)_2$, $LiN(SO_2C_2F_5)_2$, $LiC(SO_2CF_3)_3$ or $LiN(SO_2F)_2$.

According to a second aspect of the present invention, there is provided a lithium-ion battery, comprising a cathode, an anode, and a separator disposed between the cathode and the anode, and further comprising the non-aqueous electrolyte for a lithium-ion battery according to the first aspect described above.

As a further improvement of the present invention, the active material for the cathode is selected from one or more of $LiCoO_2$, $LiNiO_2$, $LiMn_2O_4$, $LiCo_{1-y}M_yO_2$, $LiNi_{1-y}M_yO_2$, $LiMn_{2-y}M_yO_4$, and $LiNi_xCo_yMn_zM_{1-x-y-z}O_2$, wherein M is selected from one or more of Fe, Co, Ni, Mn, Mg, Cu, Zn, Al, Sn, B, Ga, Cr, Sr, V or Ti, and $0 \leq y \leq 1$, $0 \leq x \leq 1$, $0 \leq z \leq 1$, and $x+y+z \leq 1$.

As a further improvement of the present invention, the active material for the cathode is selected from $LiFe_{1-x}M_xPO_4$, wherein M is selected from one or more of Mn, Mg, Co, Ni, Cu, Zn, Al, Sn, B, Ga, Cr, Sr, V or Ti, and $0 \leq x < 1$.

The non-aqueous electrolyte for a lithium-ion battery according to the present invention comprises the compound represented by Structural Formula 1. The present inventors found that the non-aqueous electrolyte for a lithium-ion battery according to the present invention has excellent high-temperature performance and low-temperature performance due to the presence of the compound represented by Structural Formula 1.

DETAILED DESCRIPTION

The present invention will be further described in detail below with reference to the accompanying drawings.

In the research aiming to improve the performances of lithium-ion batteries, the present inventors unexpectedly found that the compound represented by Structural Formula 1 has the characteristics of improving the high-temperature performance and the low-temperature performance of lithium-ion batteries very well. Based on this finding, the present invention provides a non-aqueous electrolyte for a lithium-ion battery comprising the compound represented by Structural Formula 1, and a lithium-ion battery using the non-aqueous electrolyte.

(Structural Formula 1)

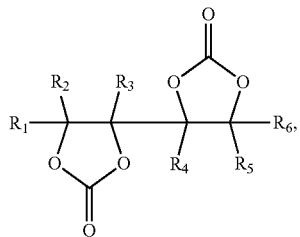

The compound represented by Structural Formula 1 can be prepared by subjecting a polyol (such as erythritol, xylitol, etc.) and a carbonate (such as dimethyl carbonate, diethyl carbonate, ethylene carbonate, etc.) to a transesterification reaction in the presence of an alkaline catalyst, followed by purification by recrystallization or column chromatography. An exemplary synthetic route is as follows:

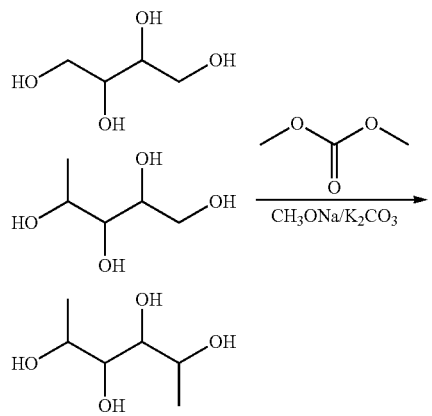

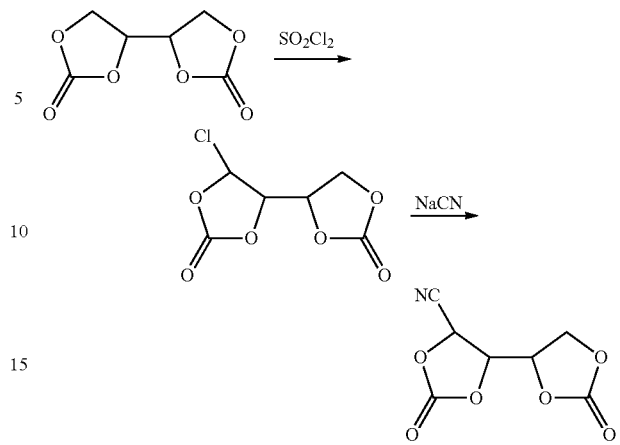

The fluorine-containing compound depicted in Structural Formula 1 can be prepared by subjecting a corresponding carbonate to fluorination with a mixed gas of $F_2/N_2$, followed by purification by recrystallization or column chromatography. An exemplary synthetic route is as follows:

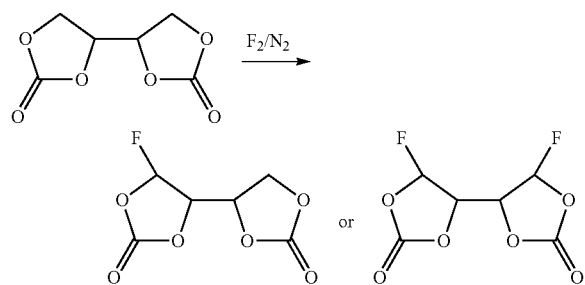

The cyano-containing compound depicted in Structural Formula 1 can be prepared by subjecting a corresponding carbonate to chlorination with a sulfonyl chloride, followed by reaction with NaCN or KCN, and followed by purification by recrystallization or column chromatography. An exemplary synthetic route is as follows:

The trimethylsiloxy-containing compound depicted in Structural Formula 1 can be prepared by subjecting a corresponding hydroxy carbonate to a substitution reaction with a nitrogen silane, followed by purification by recrystallization or column chromatography. An exemplary synthetic route is as follows:

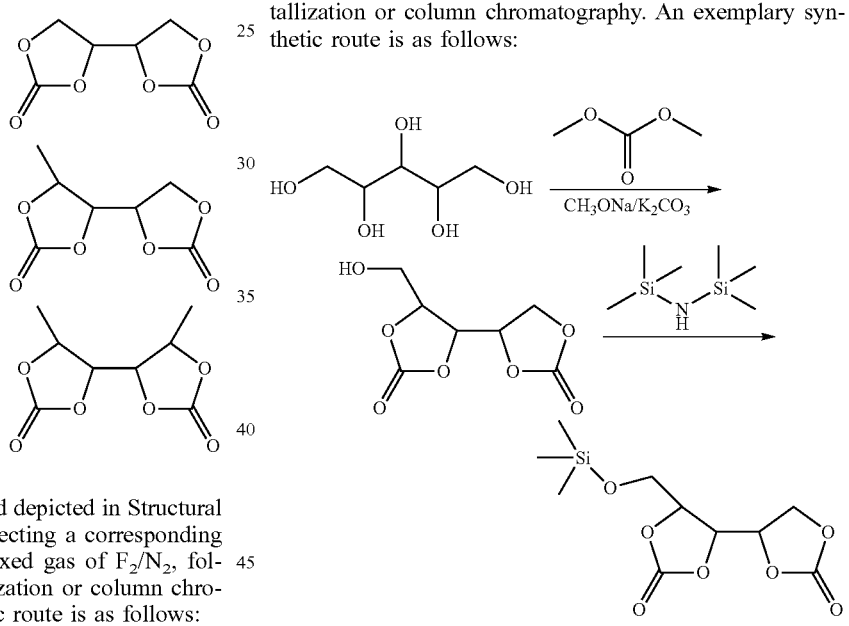

The non-aqueous electrolyte for a lithium-ion battery according to the present invention comprises the compound represented by Structural Formula 1. The mechanism of action of the compound is presumed as follows. During the initial charging, the ethylene carbonate structural units in the molecule of Structural Formula 1 can have precedence over the solvent molecules in undergoing a reductive decomposition reaction, and the reaction product forms a passivation film on the surface of the electrode, which prevents the solvent molecules from further decomposing. Moreover, as two ethylene carbonate structural units are present in the molecular structure, the passivation film formed is more stable than that formed from ethylene carbonate. Furthermore, as the passivation film formed can effectively prevent further decomposition of the solvent molecules and lithium salt molecules, the content of the high-impedance LiF component in the passivation film is relatively low, which facilitates the passage of lithium ions, thereby significantly improving the high-temperature storage and low-temperature performances of the battery.

In the compound represented by Structural Formula 1, $R_1$, $R_2$, $R_3$, $R_4$, $R_5$, and $R_6$ can each independently be selected from hydrogen, a halogen atom or a group having 1 to 5 carbon atoms.

It should be noted that in the case where $R_1$, $R_2$, $R_3$, $R_4$, $R_5$, and $R_6$ are each independently selected from a carbon atom-containing group, it is advantageous to control the number of carbon atoms at 5 or less (including 5). Controlling the number of carbon atoms at 5 or less can reduce the impedance of the battery, and can achieve the high-temperature performance and the low-temperature performance of the battery at the same time. On the contrary, if a carbon atom-containing group having 6 or more carbon atoms is selected as a substituent, the battery impedance will be increased instead, and the high-temperature performance and the low-temperature performance of the battery will be adversely affected. Thus, the present invention does not select a carbon atom-containing group having 6 or more carbon atoms as a substituent. In the present invention, the group having 1 to 5 carbon atoms is preferably a hydrocarbyl group, a halogenated hydrocarbyl group, an oxygen-containing hydrocarbyl group, a silicon-containing hydrocarbyl group or a cyano-substituted hydrocarbyl group. For example, in some preferred embodiments of the present invention, a methyl group, an ethyl group, a trimethylsilyloxy group, a cyano group or a trifluoromethyl group is preferred. In other preferred embodiments of the present invention, $R_1$, $R_2$, $R_3$, $R_4$, $R_5$, and $R_6$ are each independently selected from a hydrogen atom and a fluorine atom.

Controlling the content of the compound represented by Structural Formula 1 in the non-aqueous electrolyte will have a favorable effect on further optimization of the high-temperature performance and the low-temperature performance of the battery. In a preferred embodiment of the present invention, the content of the compound represented by Structural Formula 1 is from 0.1% to 5% based on the total mass of the non-aqueous electrolyte for a lithium-ion battery. When the content is less than 0.1%, it is difficult to sufficiently form a passivation film on the surface of the anode, and thus it is difficult to sufficiently improve the high-temperature and low-temperature performances of the battery using the non-aqueous electrolyte. When the content exceeds 5.0%, the compound cannot be completely dissolved in the non-aqueous electrolyte, and an excessively thick passivation film is formed on the surface of the anode, which will increase the internal resistance of the battery instead, thereby degrading battery performances. Researches have found that when the content of the compound represented by Structural Formula 1 is less than 0.1% or more than 5% based on the total mass of the non-aqueous electrolyte for a lithium-ion battery, the high-temperature performance and the low-temperature performance of the lithium-ion battery will be decreased to various degrees, as compared to the case when the content is in the range of 0.1%-5%, suggesting that controlling the content of the compound represented by Structural Formula 1 in the non-aqueous electrolyte is of positive significance.

Exemplary compounds with respect to the compound represented by Structural Formula 1 are shown in Table 1, but are not limited thereto.

TABLE 1

Compound 1

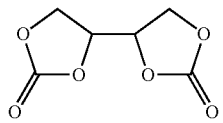 [SMILES: O=C1OCC(C2COC(=O)O2)O1]

Compound 2

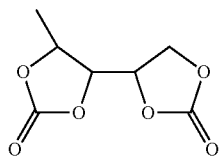

Compound 3

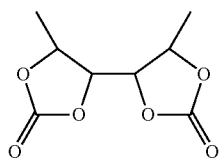

Compound 4

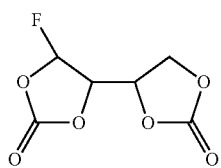 [SMILES: O=C1OCC(C2OC(=O)OC2F)O1]

Compound 5

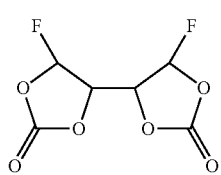 [SMILES: O=C1OC(F)C(C2OC(=O)OC2F)O1]

Compound 6

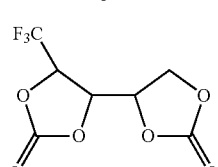

Compound 7

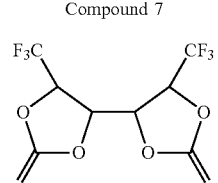

Cornpound 8

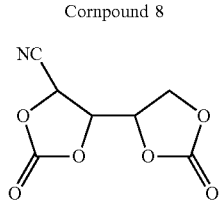

TABLE 1-continued

Compound 9

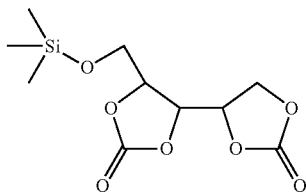 [SMILES: C[Si](C)(C)OCC1OC(=O)OC1C1COC(=O)O1]

The non-aqueous electrolyte for a lithium-ion battery according to the present invention may further comprise an additive, which for example may be selected from one or more of vinylene carbonate (VC), vinylethylene carbonate (VEC), and fluoroethylene carbonate (FEC); and may also be selected from one or more of 1,3-propane sultone (1,3-PS), 1,4-butane sultone (BS), and 1,3-propene sultone (PST). These additives can form a more stable SEI film on the surface of the graphite anode, thereby significantly improving the cycling performance of the lithium-ion battery. These additives may be added in an amount conventionally used in the art, for example, from 0.1% to 5%, preferably from 0.2% to 3%, more preferably from 0.5% to 2%, based on the total mass of the electrolyte.

Researches have shown that using the compound represented by Structural Formula 1 according to the present invention in combination with the above-mentioned additives, it is possible to obtain an effect superior to that achievable when they are used singly. It is presumed that there is a synergistic effect between them, that is, the compound represented by Structural Formula 1 and the above-mentioned additives work together to improve the cycling performance, the high-temperature storage and/or low-temperature performances of the battery.

In a preferred embodiment of the present invention, the non-aqueous organic solvent is a mixture of a cyclic carbonate and a linear carbonate, the cyclic carbonate being selected from one or more of ethylene carbonate, propylene carbonate or butylene carbonate, and the linear carbonate being selected from one or more of dimethyl carbonate, diethyl carbonate, ethyl methyl carbonate or methyl propyl carbonate.

A mixture of a high-dielectric-constant cyclic carbonate organic solvent and a low-viscosity linear carbonate organic solvent is used as a solvent for the electrolyte for a lithium-ion battery, so that the organic solvent mixture has a high ionic conductivity, a high dielectric constant and a low viscosity at the same time.

In a preferred embodiment of the present invention, the lithium salt is selected from one or more of $LiPF_6$, $LiBF_4$, $LiBOB$, $LiDFOB$, $LiSbF_6$, $LiAsF_6$, $LiN(SO_2CF_3)_2$, $LiN(SO_2C_2F_5)_2$, $LiC(SO_2CF_3)_3$ or $LiN(SO_2F)_2$, and preferably, the lithium salt is $LiPF_6$ or a mixture of $LiPF_6$ with one or more other lithium salts.

One embodiment of the present invention provides a lithium-ion battery, comprising a cathode, an anode, and a separator disposed between the cathode and the anode, and further comprising the non-aqueous electrolyte for a lithium-ion battery according to the present invention.

In a preferred embodiment of the present invention, the active material for the cathode is selected from one or more of $LiCoO_2$, $LiNiO_2$, $LiMn_2O_4$, $LiCo_{1-y}M_yO_2$, $LiNi_{1-y}M_yO_2$, $LiMn_{2-y}M_yO_4$, or $LiNi_xCo_yMn_zM_{1-x-y-z}O_2$, wherein M is selected from one or more of Fe, Co, Ni, Mn, Mg, Cu, Zn, Al, Sn, B, Ga, Cr, Sr, V or Ti, and $0 \leq y \leq 1$, $0 \leq x \leq 1$, $0 \leq z \leq 1$, and $x+y+z \leq 1$.

In a preferred embodiment of the present invention, the active material for the cathode is selected from $LiFe_{1-x}M_xPO_4$, wherein M is selected from one or more of Mn, Mg, Co, Ni, Cu, Zn, Al, Sn, B, Ga, Cr, Sr, V or Ti, and $0 \leq x < 1$.

In one embodiment of the present invention, the cathode material is $LiNi_{0.5}Co_{0.2}Mn_{0.3}O_2$, and the anode material is an artificial graphite.

The present invention will now be described in more detail below by reference to specific examples. It is to be understood that the examples are merely illustrative and are not intended to limit the scope of the present invention.

EXAMPLE 1

1) Preparation of Electrolyte

Ethylene carbonate (EC), diethyl carbonate (DEC) and ethyl methyl carbonate (EMC) were mixed at a mass ratio of EC:DEC:EMC=1:1:1, then lithium hexafluorophosphate ($LiPF_6$) was added to a molar concentration of 1 mol/L, and then based on the total mass of the electrolyte, 1% of Compound 1 was added (note: Compound 1 here is the Compound 1 shown in Table 1, the same is true for the subsequent examples).

2) Preparation of Cathode Plate

Lithium nickel cobalt manganese oxide $LiNi_{0.5}Co_{0.2}Mn_{0.3}O_2$ as cathode active material, Super-P as conductive carbon black and polyvinylidene fluoride (PVDF) as binder were mixed at a mass ratio of 93:4:3. The mixture was dispersed in N-methyl-2-pyrrolidone (NMP) to obtain a cathode slurry. The slurry was uniformly coated onto both sides of an aluminum foil, oven dried, calendered and vacuum dried. Then an aluminum lead wire was welded to the foil by an ultrasonic welder to obtain a cathode plate having a thickness of 120-150 μm.

3) Preparation of Anode Plate

Artificial graphite as anode active material, Super-P as conductive carbon black, and styrene butadiene rubber (SBR) and carboxymethyl cellulose (CMC) as binder were mixed at a mass ratio of 94:1:2.5:2.5. The mixture was dispersed in deionized water to obtain an anode slurry. The slurry was coated onto both sides of a copper foil, oven dried, calendered and vacuum dried. Then a nickel lead wire was welded to the foil by an ultrasonic welder to obtain an anode plate having a thickness of 120-150 μm.

4) Preparation of Battery Core

A three-layered film having a thickness of 20 μm was placed as a separator between the cathode plate and the anode plate, and the resulting sandwich structure composed of the cathode plate, the anode plate and the separator was wound. Then, the wound structure was flattened and placed into an aluminum foil packaging bag, and baked at 75° C. under vacuum for 48 hours to obtain a battery core, which was to be injected with the electrolyte.

5) Injection of the Electrolyte into the Battery Core and Battery Formation

In a glove box in which dew point was controlled below −40° C., the electrolyte prepared above was injected into the battery core, which was then vacuum packed and left to stand for 24 hours.

Then, conventional battery formation was carried out at initial charging in the following steps: 0.05 C constant-current charging for 180 min, 0.2 C constant-current charging to 3.95 V, vacuum packing for a second time, then further 0.2 C constant-current charging to 4.2 V, standing at ordinary temperatures for 24 hours, and then 0.2 C constant-current discharging to 3.0 V.

6) Test of Cycling Performance at High Temperatures

The battery was placed in an oven at a constant temperature of 45° C., charged at a constant current of 1 C to 4.2 V, then charged at a constant voltage until the current dropped to 0.02 C and then discharged at a constant current of 1 C to 3.0 V. This cycling was repeated, and the discharge capacity at the first cycling and the discharge capacity at the last cycling were recorded. The capacity retention rate following high-temperature cycling was calculated as follows:

Capacity retention rate=discharge capacity at the last cycling/discharge capacity at the first cycling*100%

7) Test of High-Temperature Storage Performance

The formed battery was subjected to 1 C constant-current and constant-voltage charging to 4.2 V at ordinary temperatures, and the initial discharge capacity and the initial thickness of the battery were measured. Then, the battery was stored at 60° C. for 30 days, then subjected to 1 C discharging to 3 V, and the retention capacity and the recovery capacity of the battery and the thickness of the battery after storage were measured. The formulae for calculation are as follows:

Battery capacity retention rate (%)=retention capacity/initial capacity×100%;

Battery capacity recovery rate (%)=recovery capacity/initial capacity×100%;

Thickness expansion rate (%)=(thickness of the battery after storage−initial thickness of the battery)/initial thickness of the battery×100%

8) Test of Low-Temperature Performance

At 25° C., the formed battery was subjected to 1 C constant-current and constant-voltage charging to 4.2 V, and then 1 C constant-current discharging to 3.0 V, and the discharge capacity was recorded. Then, the battery was subjected to 1 C constant-current and constant-voltage charging to 4.2 V, left to stand in an environment of −20° C. for 12 hours, and then subjected to 0.2 C constant-current discharging to 3.0 V, and the discharge capacity was recorded.

Low-temperature discharge efficiency value at −20° C.=0.2 C discharge capacity at −20° C./1 C discharge capacity at 25° C.×100%.

EXAMPLE 2

As shown in Table 2, this example was the same as Example 1 except that 1% of Compound 1 was replaced with 1% of Compound 2 in the preparation of the electrolyte. The data of the high-temperature performance and the low-temperature performance obtained in the test are shown in Table 3.

EXAMPLE 3

As shown in Table 2, this example was the same as Example 1 except that 1% of Compound 1 was replaced with 1% of Compound 4 in the preparation of the electrolyte. The data of the high-temperature performance and the low-temperature performance obtained in the test are shown in Table 3.

EXAMPLE 4

As shown in Table 2, this example was the same as Example 1 except that 1% of Compound 1 was replaced with 1% of Compound 8 in the preparation of the electrolyte. The data of the high-temperature performance and the low-temperature performance obtained in the test are shown in Table 3.

COMPARATIVE EXAMPLE 1

As shown in Table 2, this example was the same as Example 1 except that 1% of Compound 1 was not added in the preparation of the electrolyte. The data of the high-temperature performance and the low-temperature performance obtained in the test are shown in Table 3.

COMPARATIVE EXAMPLE 2

As shown in Table 2, this example was the same as Example 1 except that 1% of Compound 1 was replaced with 1% of FEC in the preparation of the electrolyte. The data of the high-temperature performance and the low-temperature performance obtained in the test are shown in Table 3.

COMPARATIVE EXAMPLE 3

As shown in Table 2, this example was the same as Example 1 except that 1% of Compound 1 was replaced with 1% of VEC in the preparation of the electrolyte. The data of the high-temperature performance and the low-temperature performance obtained in the test are shown in Table 3.

COMPARATIVE EXAMPLE 4

As shown in Table 2, this example was the same as Example 1 except that 1% of Compound 1 was replaced with 1% of VC in the preparation of the electrolyte. The data of the high-temperature performance and the low-temperature performance obtained in the test are shown in Table 3.

TABLE 2

| Example/Comparative Example | The compound represented by Structural Formula 1 and its content | Additive and its content |
|---|---|---|
| Example 1 | Compound 1: 1% | — |
| Example 2 | Compound 2: 1% | — |
| Example 3 | Compound 4: 1% | — |
| Example 4 | Compound 8: 1% | — |
| Comparative example 1 | — | — |
| Comparative example 2 | — | FEC: 1% |
| Comparative example 3 | — | VEC: 1% |
| Comparative example 4 | — | VC: 1% |

TABLE 3

| Example/Comparative Example | Capacity retention rate after 1 C cycling at 45° C. for 400 cycles | Storage at 60° C. for 30 days | | | 0.2 C discharging efficiency at −20° C. |
| --- | --- | --- | --- | --- | --- |
| | | Capacity retention rate | Capacity recovery rate | Thickness expansion rate | |
| Example 1 | 84.3% | 82.3% | 85.6% | 12.8% | 76.5% |
| Example 2 | 84.6% | 83.6% | 86.9% | 13.8% | 76% |
| Example 3 | 85.9% | 83.5% | 87.5% | 14.9% | 78.5% |
| Example 4 | 86.8% | 84.9% | 88.2% | 15.8% | 77.5% |
| Comparative example 1 | 76.3% | 70% | 74% | 18.6% | 70% |
| Comparative example 2 | 80.1% | 78.1% | 81.2% | 30% | 75% |
| Comparative example 3 | 82.1% | 79.1% | 83.1% | 12.2% | 60% |
| Comparative example 4 | 83.2% | 78.5% | 82.6% | 25.4% | 65% |

The results show that adding 1% of Compound 1, Compound 2, Compound 4 or Compound 6 to the non-aqueous electrolyte can significantly improve the high-temperature performance and the low-temperature performance of the lithium-ion battery compared to the example without addition.

EXAMPLE 5

As shown in Table 4, this example was the same as Example 1 except that 1% of Compound 1 was replaced with 0.1% of Compound 1 in the preparation of the electrolyte. The data of the high-temperature performance and the low-temperature performance obtained in the test are shown in Table 5.

EXAMPLE 6

As shown in Table 4, this example was the same as Example 1 except that 1% of Compound 1 was replaced with 2% of Compound 1 in the preparation of the electrolyte. The data of the high-temperature performance and the low-temperature performance obtained in the test are shown in Table 5.

EXAMPLE 7

As shown in Table 4, this example was the same as Example 1 except that 1% of Compound 1 was replaced with 3% of Compound 1 in the preparation of the electrolyte. The data of the high-temperature performance and the low-temperature performance obtained in the test are shown in Table 5.

EXAMPLE 8

As shown in Table 4, this example was the same as Example 1 except that 1% of Compound 1 was replaced with 5% of Compound 1 in the preparation of the electrolyte. The data of the high-temperature performance and the low-temperature performance obtained in the test are shown in Table 5.

TABLE 4

| Example/Comparative Example | The compound represented by Structural Formula 1 and its content |
| --- | --- |
| Example 5 | Compound 1: 0.1% |
| Example 6 | Compound 1: 2% |
| Example 7 | Compound 1: 3% |
| Example 8 | Compound 1: 5% |

TABLE 5

| Example/Comparative Example | Capacity retention rate after 1 C cycling at 45° C. for 400 cycles | Storage at 60° C. for 30 days | | | 0.2 C discharging efficiency at −20° C. |
| --- | --- | --- | --- | --- | --- |
| | | Capacity retention rate | Capacity recovery rate | Thickness expansion rate | |
| Example 5 | 77.5% | 74.8% | 79.6% | 17.1% | 75.2% |
| Example 6 | 84.3% | 82.5% | 85.8% | 11.8% | 76% |
| Example 7 | 85.4% | 83.6% | 87.2% | 10.2% | 75.2% |
| Example 8 | 82.3% | 81.2% | 84.5% | 8.3% | 73.1% |

EXAMPLE 9

As shown in Table 6, this example was the same as Example 1 except that 1% of FEC was additionally added in the preparation of the electrolyte. The data of the high-temperature performance and the low-temperature performance obtained in the test are shown in Table 7.

EXAMPLE 10

As shown in Table 6, this example was the same as Example 1 except that 1% of VEC was additionally added in the preparation of the electrolyte. The data of the high-temperature performance and the low-temperature performance obtained in the test are shown in Table 7.

EXAMPLE 11

As shown in Table 6, this example was the same as Example 1 except that 1% of VC was additionally added in the preparation of the electrolyte. The data of the high-temperature performance and the low-temperature perfor-

TABLE 6

| Example/Comparative Example | The compound represented by Structural Formula 1 and its content | Additive and its content | | |
|---|---|---|---|---|
| Example 9 | Compound 1: 1% | FEC: 1% | — | — |
| Example 10 | Compound 1: 1% | — | VEC: 1% | — |
| Example 11 | Compound 1: 1% | — | — | VC: 1% |
| Comparative example 2 | — | FEC: 1% | — | — |
| Comparative example 3 | — | — | VEC: 1% | — |
| Comparative example 4 | — | — | — | VC: 1% |

TABLE 7

| Example/Comparative Example | Capacity retention rate after 1 C cycling at 45° C. for 400 cycles | Storage at 60° C. for 30 days | | | 0.2 C discharging efficiency at −20° C. |
|---|---|---|---|---|---|
| | | Capacity retention rate | Capacity recovery rate | Thickness expansion rate | |
| Example 9 | 91.3% | 82.3% | 85.6% | 15.3% | 80.5% |
| Example 10 | 86.5% | 83.4% | 86.8% | 10.4% | 72.8% |
| Example 11 | 88.8% | 83.9% | 87.1% | 13.4% | 74.1% |
| Comparative example 2 | 80.1% | 78.1% | 81.2% | 30% | 75% |
| Comparative example 3 | 82.1% | 79.1% | 83.1% | 12.2% | 60% |
| Comparative example 4 | 83.2% | 78.5% | 82.6% | 25.4% | 65% |

The results show that addition of an additive (FEC, VEC or VC) on the basis of the compound represented by Structural Formula 1 according to the present invention can further improve the high-temperature performance and the low-temperature performance of the battery. In other words, addition of the compound represented by Structural Formula 1 according to the present invention on the basis of an existing additive (FEC, VEC or VC) can further improve the high-temperature performance and the low-temperature performance of the battery.

While the above is a further detailed description of the present invention in connection with specific examples, the particular implementation of the present invention should not be deemed to be limited thereto. It will be apparent to those skilled in the art that simple derivations or substitutions are possible without departing from the concept of the present invention and should be regarded as falling into the scope of protection of the present invention.

The invention claimed is:

1. A non-aqueous electrolyte for a lithium-ion battery, comprising one or more of a compound represented by Structural Formula 1,

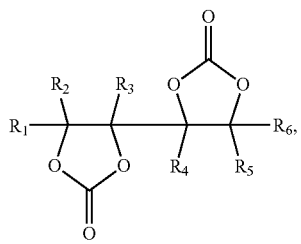

(Structural Formula 1)

wherein $R_1$, $R_2$, $R_3$, $R_4$, $R_5$, and $R_6$ are each independently selected from hydrogen, a fluorine atom or a group having 1 to 5 carbon atoms, wherein the group having 1 to 5 carbon atoms is selected from an alkyl group, a fluorinated alkyl group, an oxygen-containing alkyl group, a silicon-containing alkyl group or a cyano-substituted alkyl group, wherein the content of the compound represented by Structural Formula 1 is from 0.1% to 5% based on the total mass of the non-aqueous electrolyte for a lithium-ion battery.

2. The non-aqueous electrolyte for a lithium-ion battery according to claim 1, wherein $R_1$, $R_2$, $R_3$, $R_4$, $R_5$, and $R_6$ are each independently selected from a hydrogen atom, a fluorine atom, a methyl group, an ethyl group, a trimethylsiloxy group, a cyano group or a trifluoromethyl group.

3. The non-aqueous electrolyte for a lithium-ion battery according to claim 1, wherein the compound represented by Structural Formula 1 is specifically selected from the following compounds 1 to 9,

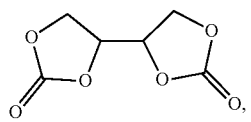

(Compound 1)

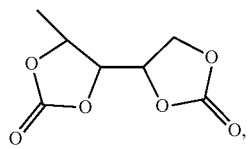

(Compound 2)

(Compound 3)

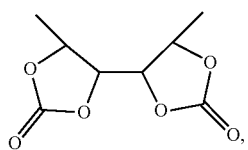

(Compound 4)

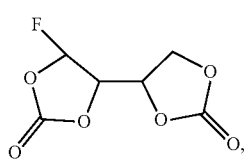

(Compound 5)

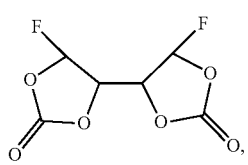

(Compound 6)

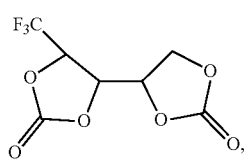

(Compound 7)

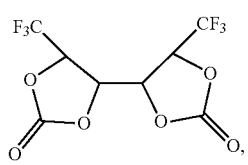

(Compound 8)

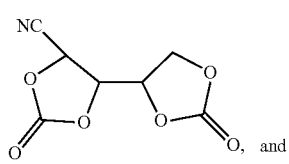, and (Compound 9)

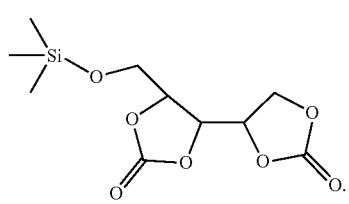

4. The non-aqueous electrolyte for a lithium-ion battery according to claim 1, wherein the non-aqueous electrolyte for a lithium-ion battery further comprises one or more of vinylene carbonate (VC), vinylethylene carbonate (VEC), and fluoroethylene carbonate (FEC).

5. The non-aqueous electrolyte for a lithium-ion battery according to claim 1, further comprising a lithium salt and a non-aqueous organic solvent, wherein the lithium salt is selected from one or more of $LiPF_6$, LiBOB, LiDFOB, $LiBF_4$, $LiSbF_6$, $LiAsF_6$, $LiN(SO_2CF_3)_2$, $LiN(SO_2C_2F_5)_2$, $LiC(SO_2CF_3)_3$ or $LiN(SO_2F)_2$; the non-aqueous organic solvent is a mixture of a cyclic carbonate and a linear carbonate, the cyclic carbonate being selected from one or more of ethylene carbonate, propylene carbonate or butylene carbonate, and the linear carbonate being selected from one or more of dimethyl carbonate, diethyl carbonate, ethyl methyl carbonate or methyl propyl carbonate.

6. A lithium-ion battery, comprising a cathode, an anode, and a separator disposed between the cathode and the anode, and further comprising the non-aqueous electrolyte for a lithium-ion battery according to claim 1.

7. The lithium-ion battery according to claim 6, wherein the active material for the cathode is selected from one or more of $LiCoO_2$, $LiNiO_2$, $LiMn_2O_4$, $LiCo_{1-y}M_yO_2$, $LiNi_{1-y}M_yO_2$, $LiMn_{2-y}M_yO_4$, or $LiNi_xCo_yMn_zM_{1-x-y-z}O_2$, wherein M is selected from one or more of Fe, Co, Ni, Mn, Mg, Cu, Zn, Al, Sn, B, Ga, Cr, Sr, V or Ti, and $0 \le y \le 1$, $0 \le x \le 1$, $0 \le z \le 1$, and $x+y+z \le 1$.

8. The lithium-ion battery according to claim 6, wherein the active material for the cathode is selected from $LiFe_{1-x}M_xPO_4$, wherein M is selected from one or more of Mn, Mg, Co, Ni, Cu, Zn, Al, Sn, B, Ga, Cr, Sr, V or Ti, and $0 \le x < 1$.

9. The non-aqueous electrolyte for a lithium-ion battery according to claim 1, wherein the non-aqueous electrolyte for a lithium-ion battery further comprises one or more of 1,3-propane sultone (1,3-PS), 1,4-butane sultone (BS), and 1,3-propene sultone (PST).

* * * * *